United States Patent [19]
Nikkel et al.

[11] Patent Number: 5,752,453
[45] Date of Patent: May 19, 1998

[54] APPARATUS FOR USE IN APPLYING FERTILIZER

[75] Inventors: Lee F. Nikkel; Eugene H. Schmidt, both of Madrid, Nebr.

[73] Assignee: A.I.T. Inc., North Platte, Nebr.

[21] Appl. No.: 593,684

[22] Filed: Jan. 29, 1996

[51] Int. Cl.⁶ ........................................ A01C 5/00
[52] U.S. Cl. ............... 111/121; 111/164; 111/167; 172/520; 172/540; 172/604; 403/203; 403/225; 403/372
[58] Field of Search ................... 111/121, 164, 111/166, 167; 172/604, 540, 520; 403/372, 225, 221, 203

[56] References Cited

U.S. PATENT DOCUMENTS

| | | |
|---|---|---|
| 526,436 | 9/1894 | Campbell. |
| 736,763 | 8/1903 | Ham. |
| 2,842,078 | 4/1958 | Immesoete. |
| 2,920,587 | 1/1960 | Shriver. |
| 3,701,327 | 10/1972 | Krumholz ........................... 111/169 X |
| 3,746,100 | 7/1973 | Hall et al.. |
| 4,040,762 | 8/1977 | Nilsson. |
| 4,077,478 | 3/1978 | Neukom. |
| 4,207,949 | 6/1980 | Sjovall. |
| 4,275,671 | 6/1981 | Baker ............................... 111/169 X |
| 4,601,602 | 7/1986 | Schnitzler ......................... 403/372 X |
| 4,646,663 | 3/1987 | Nikkel et al.. |
| 4,655,295 | 4/1987 | Barnes et al.. |
| 4,765,262 | 8/1988 | Morgan. |
| 4,930,431 | 6/1990 | Alexander. |
| 5,140,917 | 8/1992 | Swanson. |
| 5,269,237 | 12/1993 | Baker et al. ........................ 111/121 |
| 5,282,396 | 2/1994 | Crandall ........................... 403/372 X |
| 5,398,771 | 3/1995 | Hornung et al.. |
| 5,497,716 | 3/1996 | Shoup ............................. 111/166 X |
| 5,497,717 | 3/1996 | Martin ............................. 172/540 X |
| 5,556,224 | 9/1996 | Niskanen .......................... 403/372 X |

FOREIGN PATENT DOCUMENTS 700597  12/1953  United Kingdom ................... 111/166

*Primary Examiner*—Terry Lee Melius
*Assistant Examiner*—Christopher J. Novosad
*Attorney, Agent, or Firm*—Greer, Burns & Crain, Ltd.

[57] ABSTRACT

A fertilizer applying apparatus for agricultural row crops applies fertilizer at a predetermined depth and lateral distance relative to a row line. A castering pair of disks are sized and oriented to part the soil adjacent the row line in a manner which minimizes soil fracturing which distorts the seed bed.

19 Claims, 2 Drawing Sheets

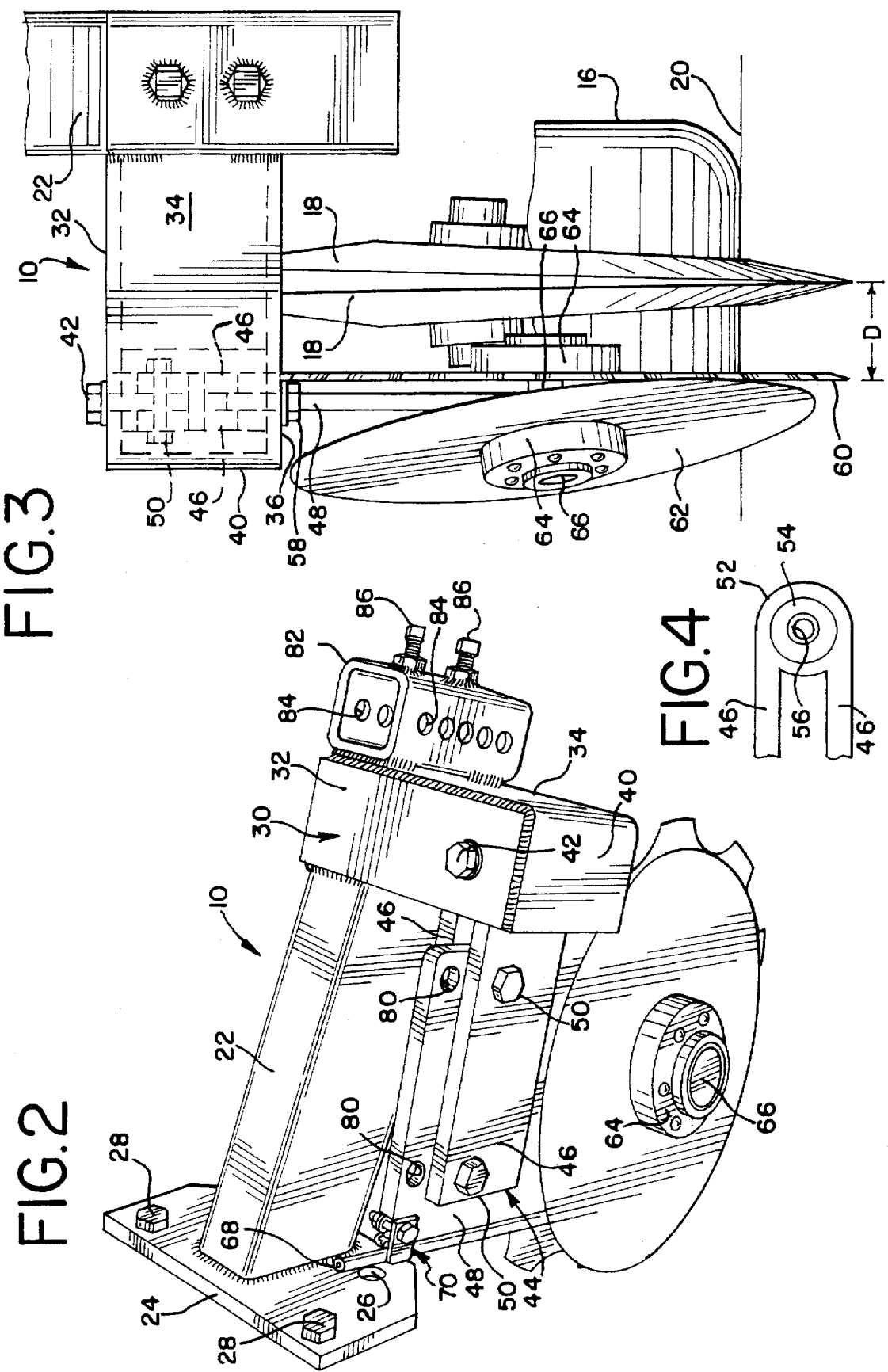

APPARATUS FOR USE IN APPLYING FERTILIZER

The present invention generally relates to fertilizer applying apparatus and more particularly to a fertilizer applying apparatus for applying fertilizer to agricultural row crops.

Agricultural producers continue to try to find ways in which to make their operations more efficient and effective, largely because the price of product has not kept pace with overall inflation of such necessities as equipment, seed, fuel and fertilizer, among other things. The efficient use of the land requires that production be maximized, and for growing corn or other row crops, it is a practical necessity to fertilize the seeds when they are planted. If the application of fertilizer is done at the same time as the seed is planted, it is important for the fertilizer to be applied at a position adjacent to the seeds so that the fertilizer will be able to provide nutrients to benefit the seed, but not be so close that it will burn the seed.

It is also known that the planting of seed corn must be at a prescribed depth in the soil to achieve optimum emergence of the crop. It is also very desirable that the fertilizer be applied in the soil at a predetermined depth that is approximately one to two inches deeper than the seed depth. However, the fertilizer should also be laterally spaced from the seed, preferably one or two inches to the side of the seed row, so that a buffer zone of soil is maintained between the fertilizer and the seed, which prevents the fertilizer from burning the seed itself.

Seed planters typically have a pair of disks which part the soil and place the seed at a predetermined depth and these disks are set up to provide a true V, where the center line of the V is substantially vertical. It is known that with a true V, the emergence of the crop is maximized. It is also known that fracturing the soil in a manner which disturbs the true V has an undesirable effect on the emergence of the crop.

While it is known that fertilizer should be applied relative to the seed as described, it is easier said than done. In addition to applying the fertilizer at the correct depth and lateral distance from the seed row, it is important that the fertilizer be applied in the manner whereby the seed bed itself is or will not be disturbed because of the fracturing of the soil by the fertilizer applying apparatus during operation. This can occur regardless of whether the seed is planted ahead or behind the fertilizer applying apparatus in the direction of movement through a field. A common problem in prior art fertilizer applying apparatus was the tendency for them to fracture the soil adjacent the seed and push the seed off to the side of the desired row line. Such fracturing distorts the seed bed which can significantly affect the emergence of the crop. For example, if the seed bed is distorted, by being pushed to the side, the plant may emerge at an undesirable angle which can affect the vitality of the plant and ultimately the yield.

Accordingly, it is a primary object of the present invention to provide an improved fertilizer applying apparatus for use with row crops such as corn, which effectively applies fertilizer at the prescribed depth and lateral distance from the row line defined by the planted seed, and which does not undesirably fracture the soil and disturb the seed bed.

Another object of the present invention is to provide such an improved fertilizer applying apparatus which applies fertilizer at a preferred depth and along a preferred line at a location ahead of the planter.

Yet another object of the present invention is to provide such an apparatus which is relatively inexpensive to manufacture and can be easily maintained during use.

Still another object of the present invention is to provide such an improved apparatus which has the capability of adjusting the depth of the fertilizer that is applied relative to the seed bed and also can be laterally adjusted relative to the row line of the seed bed.

Other objects and advantages will become apparent upon reading the following detailed description, while referring to the attached drawings, in which:

FIG. 2 is a perspective view of the apparatus of the present invention;

FIG. 3 is a front view of a portion of the apparatus of the present invention shown together with a portion of the planting implement shown in FIG. 1; and, FIG. 4 is a plan view of a portion of the apparatus as best shown in FIG. 2.

DETAILED DESCRIPTION OF THE PREFERRED EMBODIMENT

Figure 1:
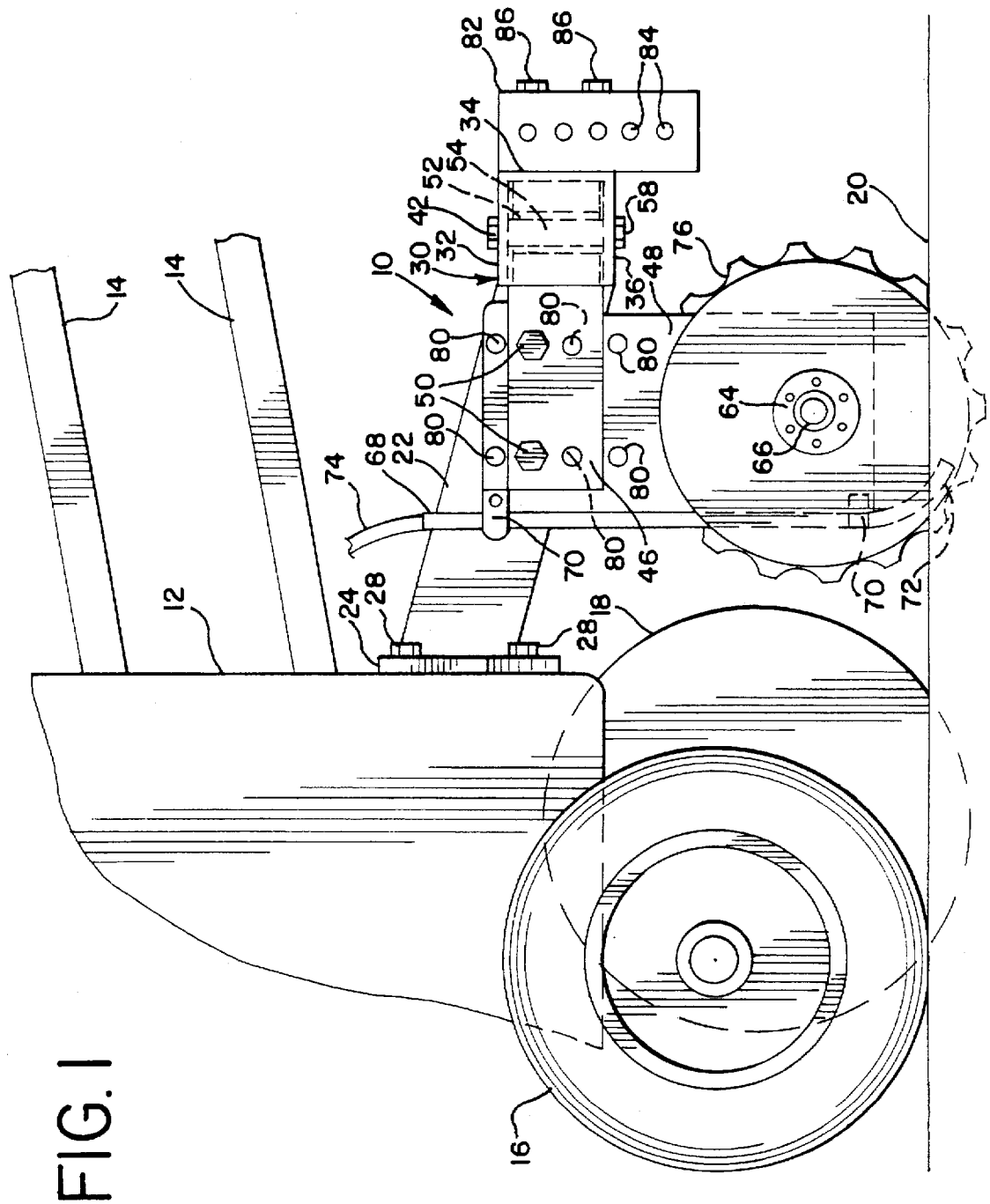
FIG. 1 is a side view of the apparatus of the present invention shown in conjunction with a planting implement.

Broadly stated, the present invention is directed to a fertilizer applying apparatus for use in the farming of row crops such as corn where fertilizer needs to be applied to the row of seeds as they are planted. The apparatus disclosed herein is adapted to apply either liquid or dry fertilizer in the ground at a predetermined depth and lateral position relative to the row line of seeds so as to facilitate the feeding of nutrients to the seed without burning the seed. The apparatus has a frame which supports an adjustable subframe that carries a disk assembly which parts or opens the soil so that fertilizer can be applied at a predetermined depth. The parting of the soil is done in a manner which greatly minimizes if not eliminates soil fracturing which can affect the seed bed. Fracturing of the soil can result in the seeds being moved to the side which can also affect the emergence of the crop. In addition to affecting the emergence or early growth of the corn plants, if the seed bed is disturbed, the plant may emerge from the soil at an angle which can ultimately affect the vitality of the plant and ultimately its yield.

Turning now to the drawings, and particularly FIG. 1, the apparatus of the present invention, indicated generally at 10, is shown being attached to a planting implement 12 which has hitch members 14 for connection to a tool bar of the planting implement or the like, a wheel structure 16 for supporting the planting implement and a pair of disks 18 which open a V in the ground 20 in which the planter plants seeds at spaced intervals as it is moved forwardly through the field, i.e., to the right as shown in FIG. 1. The line of direction of the planting implement determines the row line. It should be understood that a planting implement may have several pairs of disks 18, as well as a pair of wheels 16 for each pair, for planting multiple rows during a single pass. In this regard, there would be a fertilizer apparatus 10 associated with each of the rows so that the planted seeds of every row would be fertilized.

While the apparatus applies fertilizer ahead of the planting implement in the preferred embodiment shown, the apparatus can be located rearwardly relative to the planter disks 18, if desired. However, advantages result from the forward placement of the fertilizer apparatus relative to the planter disks 18 because the forward placement enables the wheels 16 to close the groove that is opened by the fertilizer apparatus itself as well as the groove that is opened by the planter. This has the effect of closing both of the grooves which eliminate the possibility of an open groove drying up the seed after it has been planted.

The structure of the fertilizer apparatus 10 includes a main frame member 22 that is slightly inclined as best shown in FIG. 1 and is attached to a mounting plate 24 that includes a number of apertures such as aperture 26 through which bolts 28 can be passed to attach the plate to the planting implement 12 as shown in FIG. 1. While the portion of the planting implement 12 to which the plate 24 is attached is shown to be a portion of the container which contains the seed corn to be planted, the mounting plate 24 can also be mounted to an implement bar or the like if desired. It is important that the mounting plate 24 be capable of being positioned so that the implement will be able to apply fertilizer into the ground at the appropriate lateral distance from the row line for reasons that have been previously described.

The frame member 22 is attached to a transverse frame member, indicated generally at 30, which has a square cross section, a top wall 32, a front wall 34, a bottom wall 36 and a rear wall 38, as well as an end wall 40. The top wall 32 and bottom wall 36 each have an aperture (not shown) through which a bolt 42 passes for holding an arm assembly or subframe indicated generally at 44. The arm assembly 44 is comprised of two flat arm members 46 which are spaced apart from one another a distance corresponding to the thickness of a standard 48 which is held between the members 46 by bolts 50 which pass through apertures (not shown) in the arm members 46.

The arm members 46 are attached to a cylindrical bushing 52 (see FIGS. 1 and 4) by welding or other suitable means. The bushing 52 preferably has an inner diameter of approximately 1½ inches, and which is adapted to retain a cylindrical rubber bushing 54 that has a hollow cylindrical metal core 56. The bolt 42 passes through the aperture in the top wall 32 of the transverse frame member 30, through the metal core 56 and the aperture in the lower wall 36 and has a nut 58 for tightening the bolt 42.

The outer diameter of the rubber bushing 54 is preferably about 0.060 inches larger than the inside diameter of the bushing 52 so that the rubber bushing can be pressed into the bushing 52 but is tightly fit so that the rubber bushing will not slip relative to the bushing 52 if the metal core is pivoted or torqued relative to the bushing 52. The length of the metal core 56 is only slightly less than the distance between the inside surfaces of the upper and lower walls 32 and 36, respectively, so that tightening down of the bolt 42 will tend to compress the walls 32 and 36 together and firmly hold the inner core 56 from rotating. However, a limited amount of pivotable movement of the arms 46 is possible by virtue of the resilience of the rubber. The arm assembly 44 is thereby able to pivot or caster relative to the transverse frame member 30 to a limited extent, but is constrained from large angular movement by the resistance of the rubber bushing. An advantage of this constrained pivoting is that the angular orientation of the disk 60 can be set a few degrees in the counterclockwise direction (as viewed from the top as in FIG. 2) thereby utilizing the pretorquing effect to counter or balance the side force exerted on the disk 60 by the angled disk 62. The net effect is that the use of the rubber bushing 54 in this manner enables the disk 60 to run substantially straight during operation in nearly any type of soil.

The standard 48 has a pair of disks, i.e., a Coulter disk 60 and a parting or spreaded disk 62 attached to it, and each of the disks has a hub assembly 64 which have a bearing with inner and outer races, the inner race being associated with an axle 66 that is attached to the standard 48, preferably by welding. The outer race of each hub assembly is attached to one of the disks 60 or 62. The bearings thereby enable the disks to easily rotate relative to the axle 66 and are of conventional construction. The axles 66 are oriented relative to the plane of the standard 48 in a particular way in accordance with an important aspect of the present invention.

In this regard, the axle 66 is attached to the standard 48 so that the Coulter disk 60 is parallel to the plane of the standard 48 whereas the axle 66 of the disk 62 is slightly angled so that the reach of the disk 62 is closest to the Coulter disk 60 slightly forward and near the bottom of the reach of the disk 62. The rotational axis of the parting disk 62 is oritented at angle in the range of about 3 degrees to about 10 degrees relative to the rotational axis of the Coultler disk 60. In this way, a parting cut is made in the ground and the soil separated so that fertilizer can be applied beneath the surface of the ground immediately forward the most rearward reach of the disk 62. The castering action of the apparatus as well as the almost perfectly vertical orientation of the disk 16 is important in minimizing the fracturing of the soil at the row line.

To deliver the fertilizer, a tube 68 is provided which is attached by a clamp mechanism, indicated generally at 70, which is of conventional construction and it attaches the tube to the standard 48. The tube 68 extends to an elevation near the bottom reach of the disk 62 and has an open end 72 for communicating either dry or liquid fertilizer into the ground. It is preferred that the tube 68 be stainless steel tubing having an outside diameter of ⅜ or ½ inch and that the bottom end 72 be secured by a similar mechanism 70 to the bottom of the standard 48 and that the tube be forwardly curved as shown in FIG. 1, although such a curvature is not essential.

The rigid tube 68 is connected to a flexible tube 74 by a suitable conventional clamping mechanism (not shown) and the tubing 74 is then extended back to a supply of fertilizer such as a fertilizer tank or the like of conventional construction. In this regard, it is possible to apply both liquid and dry fertilizer, although for applying dry fertilizer, it is preferred that the diameter of the tubing 68 be increased to a larger outside diameter than the ⅜ to ½ inch that is particularly useful for applying a liquid fertilizer.

In accordance with an important aspect of the present invention, the outside diameter of the Coulter disk 60 is larger than that of the disk 62 and the Coulter disk 60 preferably has a plurality of notches 76 which have a depth of approximately ¾ to ⅞ of an inch, which also generally corresponds to the outside periphery of the disk 62. The disk 62 has an outside diameter that is approximately ¾ inch less than that of the disk 60 and it is preferred that the height of the axle 66 of each of the two disks 62 and 60 be generally the same.

The notches in the disk 62 have the effect of forcing rotation of the disk. While a smooth, i.e., unnotched, disk will normally freely rotate, it is not uncommon for a smooth disk to stick. If the disk is dragged through the field without rotation, there is a much greater tendency for undesirable soil fracturing to occur. The presence of the notches 76 virtually eliminate the possibility that the disk will stop rotating during normal operation, assuming that the bearings are in normal working order.

It is important that the Coulter disk 60 be of increased diameter relative to the disk 62 so that the Coulter disk 60 will travel in a line that is substantially parallel to the row line so as to minimize fracturing of the soil where the seed is planted, i.e., along the line defined by the V made by the disks 18 as shown in FIG. 3. It is also important that the disk 62 be on the side opposite the side of the disk 60 that has the disks 18 as shown in FIG. 3. It is also preferred that the disk 60 be laterally displaced or offset to the side of the V made by the disks 18 by a distance D that is approximately 1½ to 2 inches. This is a distance that provides an adequate buffer zone of soil between the fertilizer and the seed which will significantly reduce the chances of the fertilizer burning the seed but will be close enough so that the seed can benefit from the fertilizer nutrients.

In accordance with another aspect of the present invention, the standard 48 is vertically adjustable relative to the arm members 46 by virtue of a number of apertures 80 through which the bolts 50 fit and thereby enable the elevation of the disks 60 and 62 to be adjusted relative to the wheel 16. Additionally, while the distance D between the disk 60 and the center line of the planting implement disk 18 is preferably 1½ to 2 inches, it is possible to adjust this distance (or otherwise compensate for mounting errors or changes in the planter implement and the like) by mounting the standard 48 on the outside of either of the arms 46 in addition to the previously described mounting between the arms. If it is mounted on the outside of the arms, then a spacer is preferably located between the arms to prevent them from collapsing toward one another as the bolts 50 are tightened.

A receptacle member 82 having a square cross section and a number of apertures 84 on opposite sides thereof is attached to the front wall 34 of the transverse frame member 30 and is adapted to retain a trash whipper device (not shown) which clears debris including old corn stalks and other plants that may be present in the line of the row that is often present with low till or no till farming techniques that are now often used. Retention bolts 86 which can extend through apertures in the front of the receptacle member 82 are provided for holding the trash whipper device or any other device.

From the foregoing it should be evident that an improved fertilizer application apparatus has been shown and described which has many desirable attributes. The apparatus has a clean and relatively simple design that contributes to relatively easy manufacture. It has demonstrated superior operability in that it applies fertilizer in an effective manner without disturbing the seed bed that is planted. This results in optimum emergence of the row crop which sets the stage for a high crop yield. The restrained castering action of the apparatus enables the disk 62 to track straight which minimizes if not entirely eliminates the undesirable fracturing of the soil in the row line.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. Apparatus for use in applying fertilizer in the ground adjacent to a row line of seeds being planted by a planting means during travel in a forward direction, said apparatus comprising:

frame means operatively associated with said planting means;

disk means mounted to said frame means and adapted to be horizontally pivotable about a pivot point relative to said frame means, said disk means further comprising:
a subframe that is horizontally pivotally attached to said frame means;

a first disk rotatable about an axis, and having a first predetermined diameter, said first disk being operatively attached to said subframe and being substantially vertically oriented and having its rotational axis located rearwardly of said pivot point;

a second disk rotatable about an axis and having a second predetermined diameter, said second disk being operatively attached to said subframe and being generally vertically oriented and having its rotational axis located adjacent said rotational axis of said first disk;

said rotational axis of said second disk being oriented at a predetermined angle relative to the rotational axis of said first disk, said angle being such that the forward reach of said second disk is closely adjacent to said first disk, and such that said forward reach of said second disk is closest to said first disk slightly forward and near a bottom of said reach of said second disk;

said subframe includes an arm means extending generally in the direction parallel to said first disk, said arm means being horizontally pivotally attached to said frame means at the forward portion of said arm means;

a generally vertical standard attached to said arm means, said standard having said first and second disks attached thereto; and fertilizer applying means operatively connected to said disk means for communicating fertilizer into the ground between said first and second disks.

2. Apparatus as defined in claim 1 wherein said first predetermined diameter is larger than said second predetermined diameter.

3. Apparatus as defined in claim 1 wherein said first disk has a plurality of spaced apart notches in its outer periphery, the depth of said notches defining a notch diameter that is approximately the same as said second diameter.

4. Apparatus as defined in claim 1 wherein each of said disks includes a hub mechanism that contains an axle and a bearing structure having inner and outer races and bearings located therebetween, said outer race being operatively connected to said disk and said inner race being operatively connected to said axle, each of said axles being mounted to said subframe.

5. Apparatus as defined in claim 1 wherein said small predetermined angle is within the range of about 3 degrees to about 10 degrees.

6. Apparatus as defined in claim 1 wherein said arm means has a vertically oriented cylindrical portion and an elongated resilient bushing means having a rigid inner core located in said cylindrical portion, said frame means having a frame member with a pair of spaced apertures, said apparatus including attachment means for firmly securing said inner core to said frame member, said arm means being pivotable only by deflecting said resilient bushing means, thereby permitting only limited pivotal movement of said arm means relative to said frame member.

7. Apparatus as defined in claim 6 wherein said standard is adjustably attached to said arm means, whereby the vertical elevation of said first and second disks can be changed relative to said frame means.

8. Apparatus as defined in claim 7 wherein said arm means comprises a pair of elongated flat members spaced from one another and attached to said cylindrical portion, said standard being adapted to be bolted between said pair of members, said standard containing a plurality of bolt holes in various vertical positions and adapted to receive bolts for attaching the standard to said arm means.

9. Apparatus as defined in claim 8 wherein said standard is adapted to be bolted to the outside of either of said pair of members to adjust the lateral position of said first and second disks relative to said frame means.

10. Apparatus as defined in claim 1 wherein said fertilizer applying means comprises a tube having an opening therein which extends from a supply of fertilizer, said tube being adapted to apply fertilizer at an elevation in the ground between said first and second disks rearwardly of said axes of said disks.

11. Apparatus as defined in claim 10 wherein said tube is rigid and has an open end, said tube being attached to said standard.

12. Apparatus as defined in claim 10 wherein said fertilizer applying means is adapted to apply a liquid fertilizer.

13. Apparatus as defined in claim 10 wherein said fertilizer applying means is adapted to apply a dry fertilizer.

14. Apparatus for applying fertilizer in the ground adjacent to at least one row line of seeds during planting by a farm implement moving in a forward direction, the implement having a planting mechanism for planting the seeds, said apparatus comprising:
   a frame attached to one of the planting mechanism and the implement;
   a disk means pivotably mounted to said frame and comprising:
      a subframe having forward and rearward portions, said forward portion being pivotably attached to said frame and being at least horizontally pivotable about a pivot point relative to said frame;
      a substantially vertically oriented rotatable Coulter disk having a first predetermined diameter attached to said subframe, said disk being aligned directly behind said pivot point so that it cuts the ground substantially parallel to the row line during travel;
      a vertically oriented rotatable spreader disk having a second predetermined diameter smaller than said first diameter attached to said subframe, said spreader disk being located adjacent said Coulter disk and being oriented at an angle relative thereto, said angle being such that the forward reach of said spreader disk is close to the Coulter disk and is closest to said Coulter disk at a location slightly forward and near the bottom of the reach of said spreader disk, and the rearward reach thereof is spaced a further distance therefrom, thereby spreading the ground during travel;
      fertilizer applying means operatively connected to said disk means for communicating fertilizer into the ground between said Coulter and spreader disks near said rearward reach of said spreader disk;
      said Coulter disk having a plurality of spaced apart notches in its outside diameter, the depth of said notches defining a notch diameter that is approximately the same as said second diameter.

15. Apparatus for attaching an arm means to a frame means about a pivot point located at the forward portion of said arm means, the arm means having at least one ground engaging implement component attached thereto for performing an agricultural operation, the implement including a first disk substantially parallel with the direction of travel and a second disk disposed at an angle relative to the first disk so as to generate a torquing effect thereon during movement through the ground, said apparatus permitting limited pivotable movement of said arm means, said apparatus comprising:
   a bushing means having an elongated body portion comprised of a resilient material and having a rigid portion firmly attached to said body portion;
   attachment means for attaching one of said body portion and said rigid portion to said arm means and for attaching the other of said body portion and said rigid portion to said frame member, thereby permitting only limited horizontal pivotable movement of said arm means relative to said frame member about said pivot point through resistance generated by said resilient bushing so that when said arm means is preset a predetermined amount from a straight orientation, the first disk runs substantially straight in the ground despite the torquing effect generated by the second disk.

16. Apparatus as defined in claim 15 wherein said body portion is generally cylindrical and said arm means has a generally vertically oriented cylindrical portion adapted to receive said body portion in tight engagement, said attachment means being adapted to hold said rigid portion tightly relative to said frame means so that pivotable movement occurs only as a result of the resilience of said body portion.

17. Apparatus for applying fertilizer in the ground adjacent to at least one row line of seeds during planting by a farm implement moving in a forward direction, the implement having a planting mechanism for planting the seeds, said apparatus comprising:
   a frame attached to one of the planting mechanism and the implements; a disk means pivotably mounted to said frame and comprising:
      a subframe having forward and rearward portions, said forward portion being pivotably attached to said frame and being at least horizontally pivotable about a pivot point relative to said frame;
      a substantially vertically oriented rotatable Coulter disk having a first predetermined diameter attached to said subframe, said disk being aligned directly behind said pivot point so that it cuts the ground substantially parallel to the row line during travel;
      a vertically oriented rotatable spreader disk having a second predetermined diameter smaller than said first diameter attached to said subframe, said spreader disk being located adjacent said Coulter disk and being oriented at an angle relative thereto, said angle being such that the forward reach of said spreader disk is close to the Coulter disk and is closest to said Coulter disk at a location slightly forward and near the bottom of the reach of said spreader disk, and the rearward reach thereof is spaced a further distance therefrom, thereby spreading the ground during travel;
      fertilizer applying means operatively connected to said disk means for communicating fertilizer into the ground between said Coulter and spreader disks near said rearward reach of said spreader disk;
      the planting mechanism being provided with a pair of planter disks which open a V in the ground in which the planter plants seeds, and said spreader disk being on an opposite side of said Coulter disk from the planter disks.

18. Apparatus for use in applying fertilizer in the ground adjacent to a row line of seeds being planted by a planting means during travel in a forward direction, said apparatus comprising:
   frame means operatively associated with said planting means;
   disk means mounted to said frame means and further comprising:
      a subframe that is attached to said frame means at an attachment point;

a first disk rotatable about an axis, and having a first predetermined diameter, said first disk being operatively attached to said subframe and being substantially vertically oriented and having its rotational axis located rearwardly of said attachment point;

a second disk rotatable about an axis and having a second predetermined diameter, said second disk being operatively attached to said subframe and being generally vertically oriented and having its rotational axis located adjacent said rotational axis of said first disk;

said rotational axis of said second disk being oriented at a predetermined angle relative to the rotational axis of said first disk, said angle being such that the forward reach of said second disk is closely adjacent to said first disk, and such that said forward reach of said second disk is closest to said first disk slightly forward and near a bottom of said reach of said second disk;

said subframe includes an arm means extending generally in the direction parallel to said first disk, said arm means being horizontally pivotally attached to said frame means at the forward portion of said arm means;

a generally vertical standard attached to said arm means, said standard having said first and second disks attached thereto; and fertilizer applying means operatively connected to said disk means for communicating fertilizer into the ground between said first and second disks.

19. Apparatus for applying fertilizer in the ground adjacent to at least one row line of seeds during planting by a farm implement moving in a forward direction, the implement having a planting mechanism for planting the seeds, said apparatus comprising:

a frame attached to one of the planting mechanism and the implement;

a disk means mounted to said frame and comprising:

a substantially vertically oriented rotatable Coulter disk having a first predetermnined diameter and being oriented on said apparatus so that it cuts the ground substantially parallel to the row line during travel;

a vertically oriented rotatable spreader disk having a second predetermined diameter smaller than said first diameter, said spreader disk being located adjacent said Coulter disk and being oriented at an angle relative thereto, said angle being such that the forward reach of said spreader disk is close to the Coulter disk and is closest to said Coulter disk at a location slightly forward and near the bottom of the reach of said spreader disk, and the rearward reach thereof is spaced a further distance therefrom, thereby spreading the ground during travel;

fertilizer applying means operatively connected to said disk means for communicating fertilizer into the ground between said Coulter and spreader disks near said rearward reach of said spreader disk; and the planting mechanism being provided with a pair of planter disks which open a V in the ground in which the mechanism plants seeds, and wherein said spreader disk is on an opposite side of said Coulter disk from the planter disks.

* * * * *

UNITED STATES PATENT AND TRADEMARK OFFICE
CERTIFICATE OF CORRECTION

PATENT NO. : 5,752,453
DATED : May 19, 1998
INVENTOR(S) : Nikkel et al.

It is certified that error appears in the above-identified patent and that said Letters Patent is hereby corrected as shown below:

Under "[73] of the Assignee" delete "A.I.T." and insert

--A.I.L.--

Column 3, line 31, delete "1 1/2" and insert -- 1-1/2 --

Column 3, line 62, delete "spreaded" and insert

--spreader--

Column 5, line 4, delete "1 1/2" and insert -- 1-1/2 --
Column 5, line 17, delete "1 1/2" and insert -- 1-1/2 --

Signed and Sealed this

Sixth Day of October, 1998

Attest:

BRUCE LEHMAN

Attesting Officer

Commissioner of Patents and Trademarks